(12) United States Patent
Holt et al.

(10) Patent No.: US 7,478,152 B2
(45) Date of Patent: Jan. 13, 2009

(54) SYSTEM AND METHOD FOR CONSOLIDATING, SECURING AND AUTOMATING OUT-OF-BAND ACCESS TO NODES IN A DATA NETWORK

(75) Inventors: Graham Holt, Pleasanton, CA (US); Marcio Saito, San Jose, CA (US)

(73) Assignee: Avocent Fremont Corp., Fremont, CA (US)

( * ) Notice: Subject to any disclaimer, the term of this patent is extended or adjusted under 35 U.S.C. 154(b) by 402 days.

(21) Appl. No.: 10/881,211

(22) Filed: Jun. 29, 2004

(65) Prior Publication Data

US 2006/0031447 A1    Feb. 9, 2006

(51) Int. Cl.
*G06F 15/16* (2006.01)
(52) U.S. Cl. ............... 709/223; 709/224; 709/246; 709/247
(58) Field of Classification Search ........... 709/223, 709/224, 246, 247
See application file for complete search history.

(56) References Cited

U.S. PATENT DOCUMENTS

| | | | |
|---|---|---|---|
| 6,526,442 B1 * | 2/2003 | Stupek et al. ............ | 709/224 |
| 6,769,022 B1 | 7/2004 | DeKoning et al. | |
| 2002/0116485 A1 * | 8/2002 | Black et al. ............ | 709/223 |
| 2003/0041030 A1 | 2/2003 | Mansfield | |
| 2003/0093598 A1 | 5/2003 | Park | |
| 2003/0221004 A1 * | 11/2003 | Stupek et al. ............ | 709/224 |
| 2004/0123149 A1 | 6/2004 | Tyroler | |
| 2005/0094629 A1 | 5/2005 | Zhao et al. | |

OTHER PUBLICATIONS

PCT International Search Report and Written Opinion mailed Oct. 16, 2006 in PCT/US2005/023719, International Filing Date Jun. 28, 2005.
International Search Report and Written Opinion from corresponding PCT Application No. PCT/US2006/030704 mailed Apr. 18, 2007.

* cited by examiner

*Primary Examiner*—Ario Etienne
*Assistant Examiner*—Barbara N Burgess
(74) *Attorney, Agent, or Firm*—Davidson Berquist Jackson & Gowdey, LLP

(57) ABSTRACT

A system and method for out-of-band network management is provided wherein one or more different management interfaces are converted into a common format management data. The system may encrypt the common format management data. The system may also authenticate each user that attempts to access the management interfaces.

16 Claims, 9 Drawing Sheets

SYSTEM AND METHOD FOR CONSOLIDATING, SECURING AND AUTOMATING OUT-OF-BAND ACCESS TO NODES IN A DATA NETWORK

FIELD OF THE INVENTION

This invention relates to the field of computer network management, and specifically to out-of-band network management systems that can transport management information over a network different from the data network being managed.

BACKGROUND OF THE INVENTION

Data center management professionals commonly use network management tools for monitoring and restoring the operation of network nodes such as computer servers, network appliances, security appliances, storage devices, sensors, and controls. These typical network management tools permits the professional to manage and restore the operations of the network nodes remotely. Typically, these network management tools are divided in two categories: in-band management tools and out-of-band management tools. An in-band management tool relies on the data network connected to the network nodes to transport the management information. An out-of-band management tool creates an alternative path to communicate with the network nodes using alternative hardware means such as dial up phone lines or separate networks that are used exclusively for management. The out-of-band management tool permits the supervisor to access the managed network nodes even when the network nodes lose network connectivity.

The in-band management tools rely on network protocols, such as Simple Network Management Protocol (SNMP), which are commonly used to manage large networks. Several examples of commercial in-band management tools following that architecture are the HP® Open View, IBM® Tivoli, BMC® Patrol, and CA® Unicenter products. However, these in-band tools become ineffective whenever the data network associated with the network nodes fails or a managed device loses network connectivity. Thus, these in-band network management tools leave network administrators in a deadlock position (e.g., the device fails and brings the data network down and the administrator cannot reach the device because the data network is down). Examples of common causes of the deadlock position include software crashes, configuration errors, hardware malfunctions caused by power surges, need to upgrade firmware and/or network failures. Thus, failures that cause the network node to be disconnected from the data network require a human operator to travel to the location where the network node is located so that the human operator can interact with the piece of failing equipment through a terminal directly connected to a management port or actuate physical control switches to restore functionality of the failing equipment. The need to have a human operator travel to the location of the network node is expensive, causes a great amount of time to be spent by the human operator, and causes business losses by causing long data network downtime.

To overcome this limitation of in-band network management tools, systems were created that enable the remote access to the out-of-band management ports and other control functions of the network node, such as power-cycling, monitoring of temperature and other health indicators, without the need for a human operator to physically travel to the location where the incident occurred. Typically, the physical interfaces for out-of-band access includes serial consoles, KVM ports, power circuits, temperature and humidity probes and/or remote actuators. While effective, the building of an alternative, independent network using different connection media for out-of-band access increases the cost of building a data center.

In an effort to standardize the physical interface and reduce the cost of out-of-band access, an industry consortium has developed an interface called Intelligent Platform Management Interface (IPMI). Other vendors have created similar proprietary interfaces. For example, HP® has its Integrated Lights-Out (ILO) interface and Sun Microsystems® has its Advanced Lights Out Module (ALOM) interface. The protocols for these interfaces are well known. These out-of-band management interfaces can only be used with certain types of network nodes and define a protocol above TCP/IP and utilize common Ethernet media for transport of the management information.

Both legacy and newer out-of-band interfaces and protocols lack the robustness and security features to be transported beyond the local management network. Thus, there is a need for aggregators or gateways that consolidate one type of access interface and can provide the authentication and encryption functions required for remote network management. Examples of those aggregators include console servers (aggregators for serial console), KVM-over-IP switches (aggregators for keyboard-video-mouse ports), intelligent power distribution units (aggregators for power control circuits), IPMI gateways (aggregators for IPMI interfaces), etc. Several commercial products exist to aggregate each type of access interface/physical media and provide remote access.

The resulting conventional situation is a typical heterogeneous data center that utilizes a plurality of disparate systems for a complete management solution of new and legacy systems. In addition to the in-band management tools, data center managers utilize console servers (for Unix/Linux systems, network equipment and automation devices), KVM-over-IP switches (for Windows servers), intelligent power control units (for remote power control), environmental monitoring and the software systems associated with each type of out-of-band interface. This increases the cost to implement and the complexity to operate management systems for data networks, requires a great amount of training, fosters problems caused by operator errors, and increases the time needed to correlate incidents from different management systems and restore network services. Thus, it is desirable to provide a system and method for securing, consolidating and automating out-of-band access to network nodes in a data network wherein various different protocols and interfaces are supported and it is to this end that the present invention is directed.

SUMMARY OF THE INVENTION

The invention is a system that provides a single common aggregation point for a plurality of out-of-band interfaces, offering consolidation close to the managed devices that avoids the transport of disparate data streams across the corporate and public networks. The system also provides a single graphical user access interface to the out-of-band infrastructure, independent of physical interface, through any computer connected to the data network directly or to the system that embodies this invention through a modem connection. The system also provides a single encryption and user authentication model, integrated to other enterprise security mechanisms, to secure the management data and prevent unauthorized access to the management ports independent of the out-of-band physical media. The system also provides local incident correlation capabilities that are independent of a centralized network management system so that it is possible to automate the execution of pre-programmed actions in response to pre-programmed events. The system also provides integration between the out-of-band domain and the high-level network management systems so that data center management can be consolidated in one single system.

The present invention comprises a system and method for securing, integrating, automating and consolidating out-of-band management independent of the physical and logical interfaces in use. The system includes a connection mechanism that supports at least two interfaces selected from the group consisting of: serial consoles, KVM ports, power circuits, sensors and controls, Telnet and SSH, Intelligent Platform Management Interface (IPMI), Integrated Lights Out (ILO), Advanced Lights Out Management (ALOM).

Thus, in accordance with the invention, an out-of-band management system for computer networks is provided. The system comprises a plurality of network nodes manageable through a dedicated management interface other than the data transmission interfaces wherein the plurality of network nodes use at least two different types of management interfaces that generate management data. The system also has a management module, executing on a computer, that converts the different types of management interface management data into a common management data format and that communicates the common management data format to a network management system. The network management system further comprises a web server application, executing on a computer, that generates a graphical user interface based on the common management data format and a web-browser that permits a user to access the management module.

In accordance with another aspect of the invention, an out-of-band network management method executing on a computer system for managing one or more network nodes with one or more management interfaces and management protocols is provided. Using the method, management data from the one or more management interfaces is received and the management data of the one or more management interfaces is converted into a common management data protocol. The common management data is communicated to a network management system that publishes a graphical user interface based on the common management data on a web server and permits access to the management interfaces using a web-browser.

In accordance with another aspect of the invention, an out-of-band network management apparatus executing on a computer system for managing one or more network nodes with one or more management interfaces and management protocols is provided. The apparatus has management means, executing on a computer system, for converting the one or more management protocols into a common management data protocol and for communicating that common management data to a network management system. The network management system further comprising means, executing on a computer system, for publishing a graphical user interface based on the common management data and a web-browser utilized by the user to access the management application and the common management data.

In accordance with yet another aspect of the invention, an out-of-band network management apparatus executing on a computer system for managing one or more network nodes with one or more management interfaces and management protocols is provided. The apparatus comprises a management application executing on a computer system that converts the one or more management protocols into a common management data protocol and communicates that common management data to a network management system. The network management system further comprises a web server application executing on a computer system that publishes a graphical user interface based on the common management data and a web-browser utilized by the user to access the management application and the common management data.

DETAILED DESCRIPTION OF A PREFERRED EMBODIMENT

The invention is particularly applicable to an out-of-band network management system that interfaces with specific managed devices set forth below over the Internet and it is in this context that the invention will be described. It will be appreciated, however, that the system and method in accordance with the invention has greater utility since the system may be used with any existing interfaces and protocols as well as any newly developed interfaces and protocols.

Figure 1:
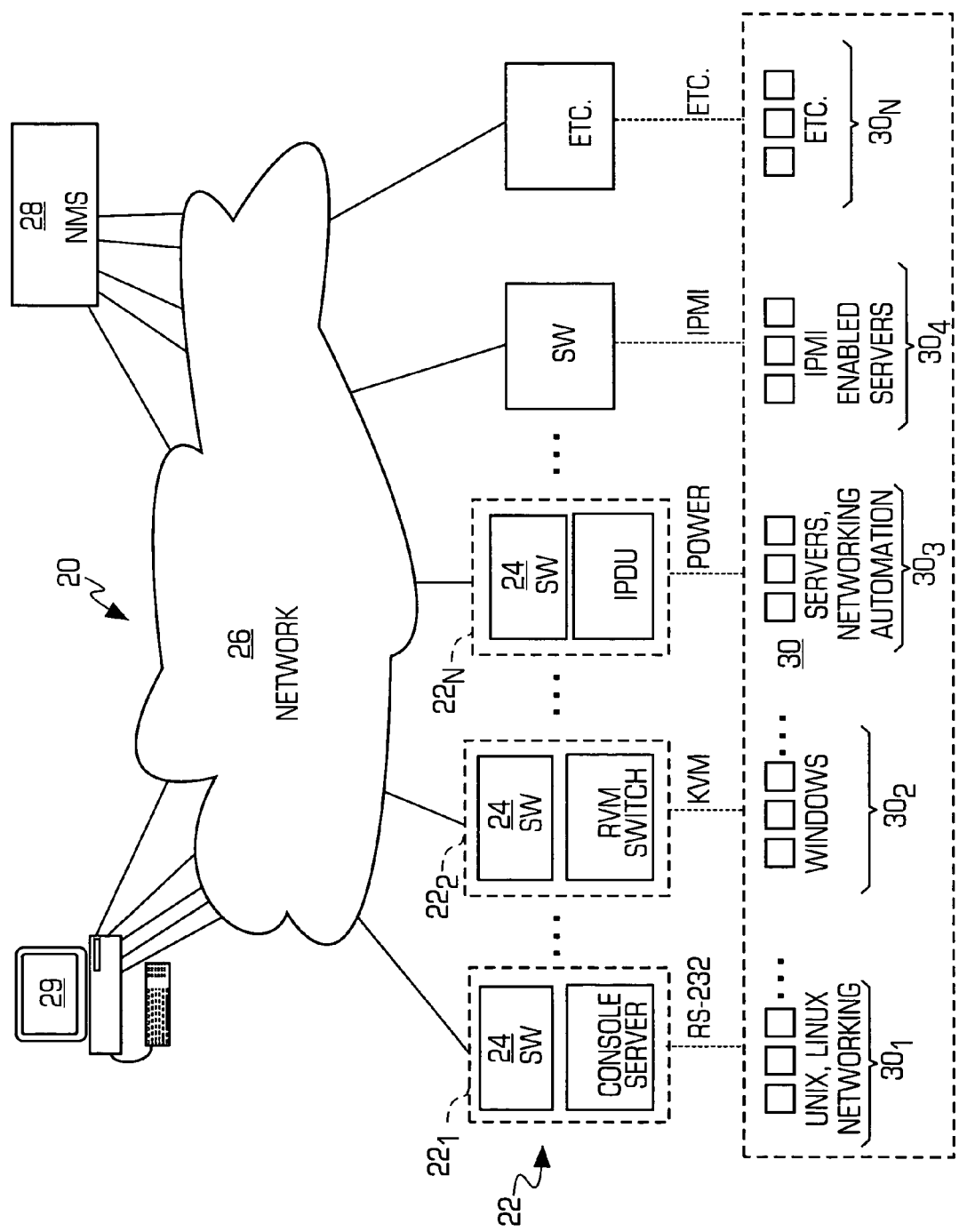
FIG. 1 is a diagram illustrating a typical out-of-band network management system.

FIG. 1 is a diagram illustrating a typical out-of-band network management system 20. The system 20 has one or more out-of-band monitor devices 22, such as an RS-232 device $22_1$, KVM device $22_2$ and a IPDU device $22_N$. Each of these devices 22 typically has one or more pieces of software 24 loaded onto the device that perform some functions/operations. In this typical system, each device 22 monitors a particular type of managed device using a particular protocol, such as the RS-232 box is used to monitor and manage Linux and Unix servers and network equipment using the well known RS-232 protocol. As another example, the KVM device is used to monitor Windows boxes with a well known KVM protocol. In this system, each device 22 monitors and manages a particular managed device or group of managed devices 30, including but not limited to Unix Servers, Windows Servers, Blade Servers and Blade chassis, Telecom equipment, network routers, switches, load balancers, network attached storage and remote access servers, and generates management data about that group of managed devices. In the example shown in FIG. 1, the managed devices 30 include Unix, Linux and networking devices $30_1$ that are managed using the RS-232 protocol, the Windows systems $30_2$ that are managed using the KVM protocol, servers and network automation devices $30_3$ that are managed using the power protocol, IPMI enabled servers $30_4$ that are managed using the IPMI protocol and other managed devices $30_N$. As shown, each device may utilize a different protocol, such as the RS-232 protocol, the KVM protocol, the power device protocol, the IPMI protocol etc. The management data generated by each device 22 has its own unique protocol and format. Thus, each device 22 consolidates the out of band management data, but focuses on a single type of media, such as a serial console by MRV or Lantronix, a KVM console by Avocent, an IPMI console by Intel, Blades by IBM, etc. . . . Then, the consolidation of the management data occurs at the network management system (and not close to each managed device). The management data for each device 22 represents the consolidated data for the types of managed devices 30 managed by that particular device. The management data from the managed devices is then sent over a communications network 26, such as the Internet, wide area network, local area network, any combination of these networks or any other communications network, to a network management system 28 or a network management workstation 29 whose operation, features and functions are well known.

In this typical system, the management data communicated between the devices 22 and the network management system 28 is not encrypted or the data must be encrypted at each device 22 resulting in a laborious process or no encryption. This system also requires that the various different management data from the different devices 22 is consolidated at the NMS 28 so that the various data stream must pass over the communications network which results in a tremendous amount of data traffic over the communications network. In addition to the disadvantages of transporting multiple data streams over a network, the consolidation at the NMS 28 requires the user (or the NMS system) to authenticate/login into each different system separately which is inconvenient, time consuming and results in lower overall system security. An out-of-band network management system in accordance with the invention allows for a single authentication/login process to control access to all devices, independent of access media. The existing media-specific consolidation systems are not extensible by design to support multiple access media and, as a consequence, while not preventing the co-existence of legacy and new network devices using different access medias, the existing systems do not facilitate such co-existence. The result is an increase in the complexity of the network systems and the creation of a barrier to new technologies. An out-of-band network management system in accordance with the invention that overcomes these limitations of typical systems will now be described.

Figure 2:
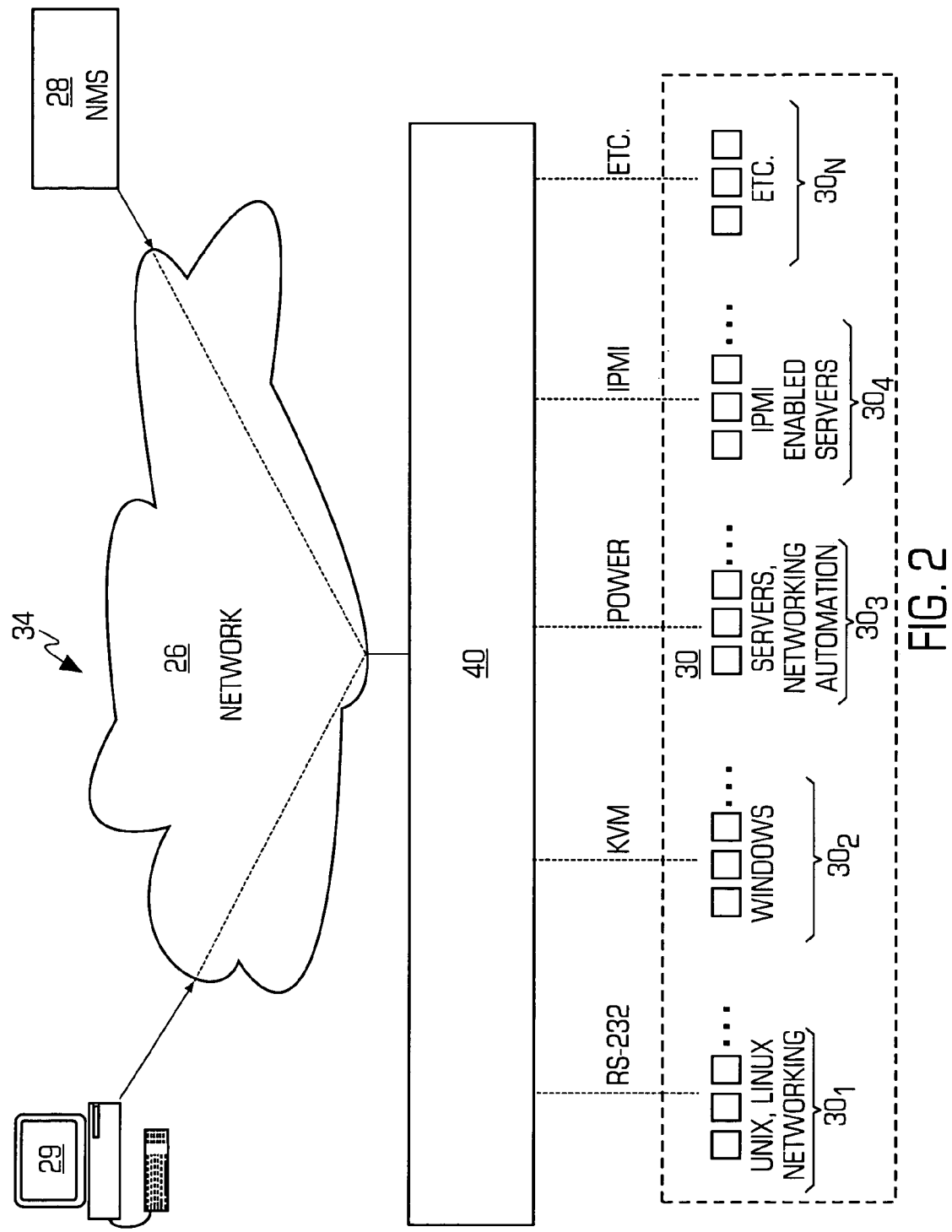
FIG. 2 is a diagram illustrating an out-of-band network management system in accordance with the invention.

FIG. 2 is a diagram illustrating an out-of-band network management system 34 in accordance with the invention. As with FIG. 1, the system may be used to manage various managed devices/groups of managed devices 30 that use different management protocols as shown. The equipment being managed in accordance with the invention includes, but is not limited to, Unix Servers, Windows Servers, Blade Servers and Blade chassis, Telecom equipment, network routers, switches, load balancers, network attached storage and remote access servers that are being accessed using a multitude of access devices and protocols including but not limited to Serial Console Servers, Keyboard Video Mouse switches, Intelligent Platform management Interface, HP Integrated Lights out interface, SUN Advanced Lights out Management interface, IBM Blade Center management module. Broadly, the invention allows users (at the network management system 28 or workstation 29, to control power, access the system management interface, record and create alerts based on internal sensors and system log messages. The invention provides a single secure point of access to the managed devices 30 through the managed network and allows centralized enforcement of security policy in regard to authentication, authorization, accounting and encryption. A standard user interface is implemented which allows access to the above mentioned features independent of the connection technology or technologies being used by each system.

In accordance with the invention, the out-of-band network management system 34 further comprises a management module 40 that may be one or more software modules each comprising a plurality of lines of computer code that implement the functions of the management module described below. In an exemplary implementation of the system 34, the management module is the Alterpath Manager product that is sold by Cyclades Corporation. In accordance with the invention, the management module 40 may be executed on a computing resource with sufficient memory and processing power to implement the management module, such as a server for example. As shown in FIG. 2, the management module 40 consolidates the management data from the various managed devices $30_1$-$30_N$ with the various different protocols and converts the management data into a common format as described below in more detail so that the management data of the managed devices is consolidated closer to the managed devices. The management module may also encrypt the management data using well known techniques and then communicate the data over the communications network 26 using well known protocols. Thus, the management module is able to enforce a security protocol for all of the management data. The management module also eliminates the transmission of the management data with the plurality of different protocols over the communications network 26 so that the total amount of data communicated over the communications network 26 is reduced. In a preferred embodiment, the encrypted or unencrypted management data from the management module is communicated to the network management system 28 and/or workstation 29 using the well known simple network management protocol (SNMP), a web server and/or an SSH protocol. In accordance with the invention, the protocol used to communicate the management data from the management module to the network management system 28 may be changed/updated to any protocol without departing from the scope of the invention.

As shown in FIG. 2, each group of management devices 30 communicates using a particular protocol and a particular connection type. For example, the Unix, Linux and networking devices $30_1$ utilize an RS232 protocol transported over a Telnet/SSH link by a console server while the Windows devices $30_2$ utilize a KVM protocol over a Web proxy link. The servers and network automation devices $30_3$ utilize a command line interface (CLI) protocol and the IPMI enabled devices $30_4$ use the well known IPMI protocol. In accordance with the invention, users of the system 34 access the managed systems through a single secure and consolidated user interface, such as using a typical web browser (not shown) with the addition of a command line interface. A further interface provides services to proxy and translate information from the managed network which is passed to existing Network management systems. In accordance with the invention, the management module 40 may include one or more drivers (not shown) that permit the management module to interface with the various different management protocols. The management module 40 further comprises a web user interface module (not shown) that may be accessed using the well known HTTP or HTTPS protocols, a command line interface module (not shown) that may be accessed using the well known SSH or Telnet protocols and a messaging interface module (not shown) that provides connectivity for the management module 40 with known in band network management systems.

Figure 3:
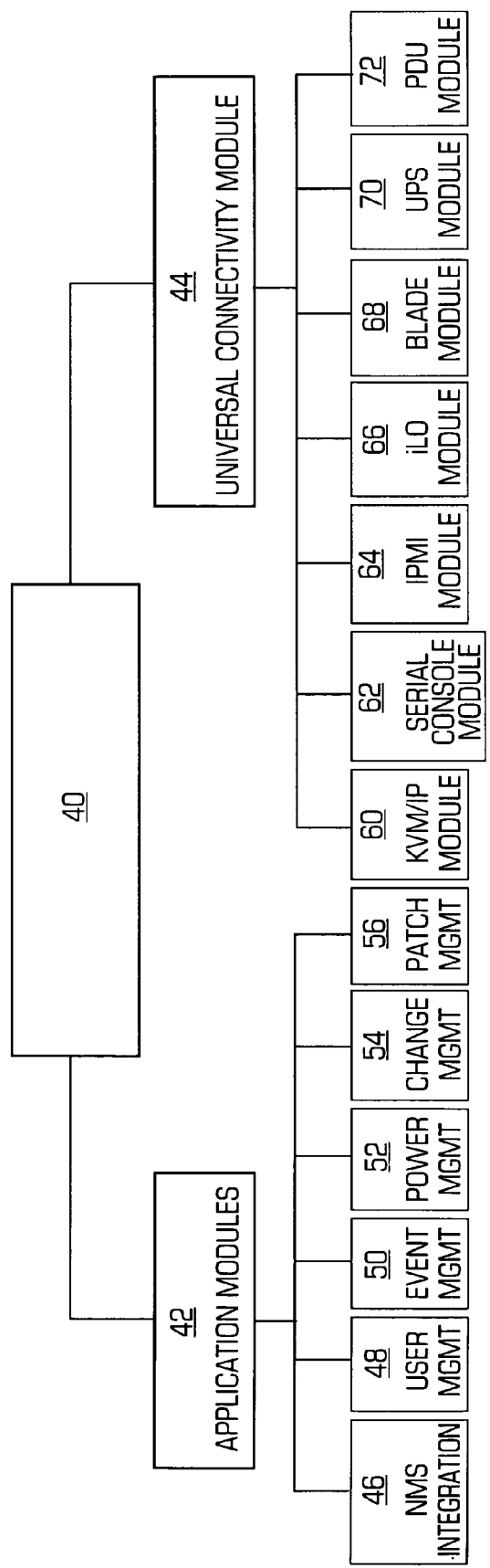
FIG. 3 is a diagram illustrating more details of the management module of the out-of-band network management system in accordance with the invention.

FIG. 3 is a diagram illustrating more details of the management module 40 of the out-of-band network management system in accordance with the invention. The management module may comprise a management application module 42 and a universal connectivity module 44 wherein each of these modules may comprise, in a preferred embodiment, a plurality of lines of computer code that are executed on a computing resource, such as a server computer, that implement the functions of the management module. In general, the management application module will handle device management, device control and event handling functions. The management application module may also typically include interfaces to known network management systems, such as HP® OpenView, IBM® Tivoli, CA® Unicenter and BMC® Patrol for example. The universal connectivity module 44 may implement one or more services wherein the services include but are not limited to connection to management consoles, update of management console firmware, configuration of management interfaces, power control, alarm collection, and translation from standard protocols such as SNMP to proprietary protocols such as HP iLO. In more detail, the universal connectivity module 44 may handle requests from the management application module 42 and will translate service requests into protocol specific interactions with the various supported management interfaces and protocols. For example, a NMS or system administrator may want to power cycle a certain network node to recover it from a catastrophic software failure. The system may provide a single interface that enables the "power cycle" command. This command can be translated by the system into a command line send over a serial interface to an Intelligent Power Distribution Unit (IPDU) (in case the device is connected for power control through an external IPDU), or into an IPMI command transmitted over a network interface (in the case the device is IPMI enabled) or into an ALOM command line interface sent over a Telnet connection (if the device to be power cycled is an ALOM-enabled Sun server.)

As another example, the system may identify network events generated by network nodes using a variety of protocols: clear text on the console part of a router, an alarm received from a server over the IPMI protocol, a sensor reading from a temperature sensor, etc. All of those events are processed through a single engine and displayed/managed on a single interface by the user. Since each type of management interface may use different protocols, encryption methods, authentication methods, command syntax etc, the universal connectivity module 44 may perform all necessary translations in both directions to allow the management application module 42 to utilize the services of the management interface in a standard and uniform way. In accordance with the invention, the management interfaces supported using the universal connectively module 44 is not limited to the management interfaces shown since, when a new management interface is developed/implemented/promulgated, a new module may be incorporated into the universal connectivity module 44 to handle the new management interface. The universal connectivity module 44 simplifies the process of creating management and other applications that require access and control of a plurality of management interfaces in equipment including but not limited to Unix servers and workstations, Linux servers and Workstations, Microsoft Windows servers and workstations, network routers, network switches, firewalls, telecom switches, storage devices, Blade servers, computer clusters.

In more detail, the application module 42 may further comprise a network management system integration module 46, a user management module 48, an event management module 50, a power management module 52, a change management module 54 and a patch management module 56 wherein each module comprises, in a preferred embodiment, a plurality of lines of computer instructions that implement the function of the particular module. The network management system integration module 46 permits the management module 40 to integrate with other well known network management systems as described above and the user management module 48 permits the network management system 34 to perform various user related functions such as user authentication and security, user login, user database management, etc. . . . The event management module 50 permits the management module 40 perform automatic network management event detection and automatic action execution in response to the detected event and the power management module 52 permits the management module 40 to control the power of the managed devices 30. The change management module 54 permits the centralization of configuration information for other elements of the out-of-band management network, such as console servers, KVM switches, IPDUs, IPMI, iLO agents, etc. while the patch management module 56 permits the automated control and update of firmware patches for other elements of the out-of-band management network, such as console servers, KVM switches, IPDUs, IPMI, iLO agents, etc.

In accordance with the invention, the universal connectivity module 44 may further comprise a KVM/IP module 60 that permits the management module 40 to interface with a well known KVM management interface, a serial console module 62 that permits the management module 40 to interface with a well known RS-232 management interface, a IPMI module 64 that permits the management module 40 to interface with a well known IPMI management interface, a iLO module 66 that permits the management module 40 to interface with a well known iLO management interface, a blade module 68 that permits the management module 40 to interface with a well known Blade management interface, a UPS module 70 that permits the management module 40 to interface with a well known uninterruptible power supply management interface and a PDU module that permits the management module 40 to interface with a well known PDU management interface. As described above, further modules in the universal connectivity module 44 may be added to accommodate new management interfaces. Each of the modules comprises, in a preferred embodiment, a plurality of lines of computer instructions that implement the API for the particular management interface.

For example, the control by a power management module 52 (see below) of a power management device, such as the Cyclades PM device. The Cyclades PM is connected with an RS232 serial connection to a Cyclades TS console server wherein the Cyclades PM is being used to control power to several servers. The power management module 52 may issue the following command: Power Off(Cyclades PM, IP Address, TCP Port, Outlet, Username, Password, SSH). In accordance with the invention, the system loads the Cyclades PM driver (that will translate the command into the corresponding command for the Cyclades PM device by: 1) opening an SSH connection to the IP address and Port Number; 2) login as the Username with the Password; 3) issue the command to power off the Outlet (pm off outlet); and 4) provide feedback to the application of the results code for the command. The actual commands generated by on the above command would be:

ssh user:port@IP Address
    pm off outlet
    read exit code

Thus, the original command above is converted into the set of commands listed in order to achieve the desired operation of the power management device.

Figure 4:
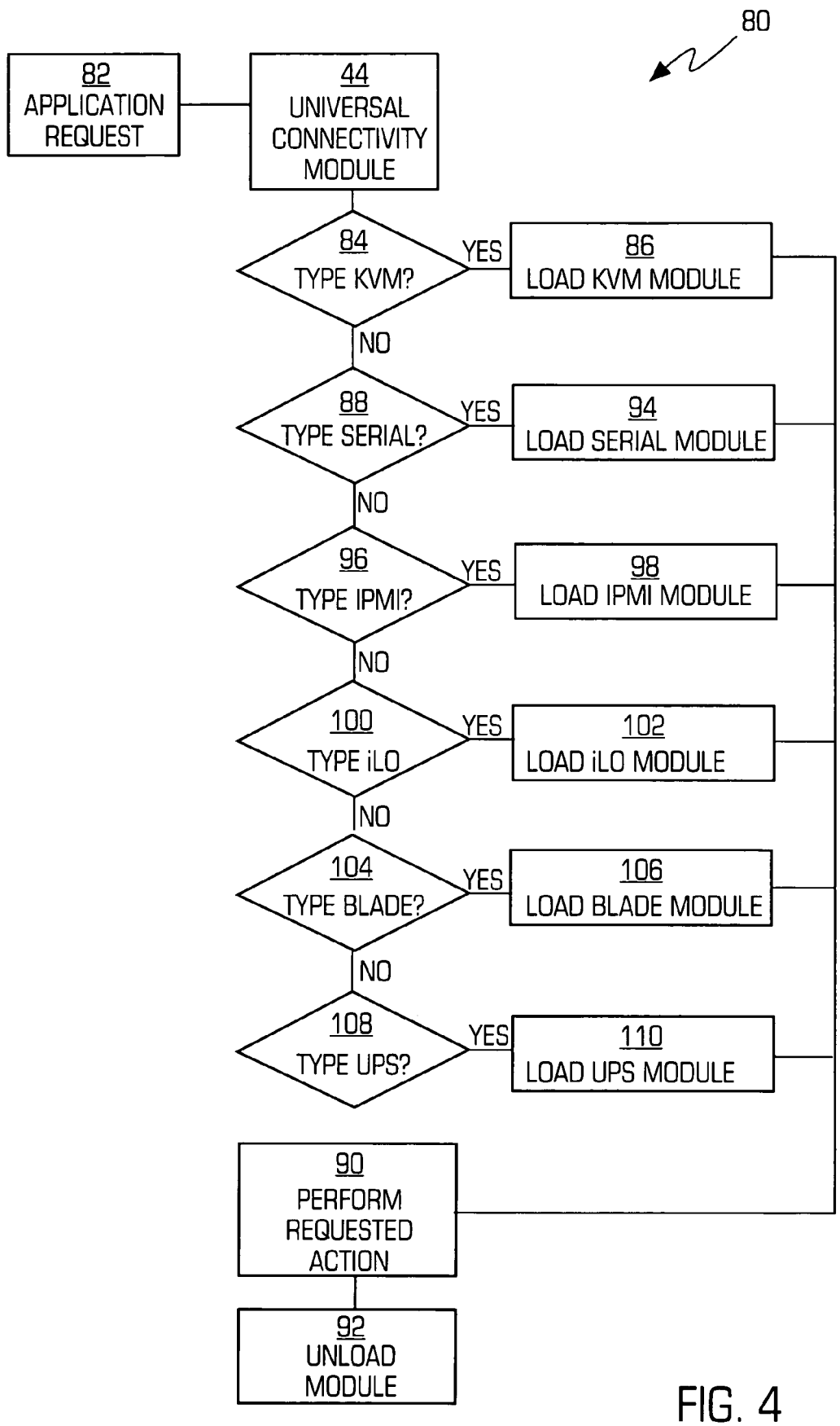
FIG. 4 is a diagram illustrating a method for managing the management data connection interfaces in accordance with the invention.

FIG. 4 is a diagram illustrating a method 80 for managing the management data connection interfaces in accordance with the invention. In step 82, an application request is received by the universal connectivity module 44 wherein the module 44 loads a driver on demand for any supported interface type and processes the service request from the application. With the application request, the module 44 will receive information from the application indicating which type of interface is to be used and also which service is required. Thus, in step 84, the module 44 may determine if the requested module is of the KVM type and the load the KVM module in step 86 or proceeds to step 88. If the module is identified and loaded, then in step 90, the requested action is performed and the module is unloaded in step 92. In step 88, the module 44 determines if the requested module is of the serial type and then loads the serial module in step 94 or proceeds to step 96. In step 96, if the requested module is not of the KVM or serial type, the module 44 determines if the requested module is of the IPMI type and loads the IPMI module in step 98 if the IPMI module was requested. In step 100, the module 44 determines if the requested module is of the iLO type and load the iLO module in step 102 if the iLO module was requested or proceed to step 104 in which the module 44 determines if the requested module is the Blade type module. If the Blade type module is requested, then in step 106, the Blade module is loaded. In step 108, the module 44 determines if the requested module is of the UPS type and that module is loaded in step 110 if the UPS module was requested. Thus, the module 44 loads the appropriate module type which will perform all necessary communication with the management interface using the specific protocol as required by the interface. In accordance with the invention, all necessary protocol and data format conversions are performed by the module 44 to allow transparent access for the application to the supported services of the specific interface type. In one exemplary embodiment, the module 44 may provide support for interface types including but not limited to KVM over IP, serial console server, HP iLO, Intelligent Platform Management Interface (IPMI), Intelligent Power Distribution units (IPDU), IBM Blade Center and Sun Advanced Lights Out Management. It can also be seen that future management interfaces and protocols can be easily integrated into this structure by the addition of a protocol specific driver/module which will handle all necessary protocol and data conversions allowing a standard API to be used from the application layer which will remain unchanged.

The main purpose of the universal connection module 44 is to manage the different connection types and protocols employed by each different system management interface. An example of the functionality and services provided by the universal connection module 44 may include session setup, session teardown, authentication of sessions, encryption of data, transport of data, conversion of command syntax, transport of system status (temperature, voltages, fan speed etc) and power control. To illustrate the differences between the management interfaces, several examples of management interface types and their capabilities will be described in more detail.

Serial Console

A serial console communicates using ASCII coded characters over a serial RS232 interface. In addition, support is available for transmission of special non-ASCII characters such as the Break signal that is utilized by the management console of Sun Server and Cisco Routers (among others). The serial console management interfaces are normally found in network equipment such as routers and switches as well as in Unix and Linux computer systems.

The serial console driver/module 62 of the universal connectivity module must be capable of converting the ASCII coded RS232 serial stream to a format suitable for transmission to the central management application. The conversion of the serial console data stream to TCP/IP packets is normally performed by a device knows as a console server such as the Cyclades ACS family and the universal connectivity module is capable of converting these TCP/IP packets back to a serial stream for processing by the application layer/modules. The driver/module 62 may also accommodate the transmission of special characters such as the break signal. In a preferred embodiment of the system, the transport used is Telnet or SSH. The universal connectivity module may also handle connection setup and teardown following the normal Telnet and SSH protocols. The universal connectivity module is also capable of performing the necessary authentication to access the management console which can take many forms including but not limited to Radius, TACACS+, SecureID, SSH key, NIS, Kerberos, X509 certificates, Active director or LDAP. ASCII, RS232, Telnet, SSH Secure Shell, TCP/IP, and Break signals are all commonly known terms and protocols specified in various international standards and RFCs. For more information see EIA232E of the RS232 Standard which is incorporate herein by reference, RFC854 for the Telnet Protocol Specification which is incorporated herein by reference and the ANSI X3.4-1986 and other variations for ASCII standards which is incorporated herein by reference.

KVM Console

The KVM (Keyboard Video Mouse) console is the management interface used to commonly communicate with graphical user interfaces such as those found in Microsoft Windows systems. The KVM console requires the keyboard, video and mouse signals of a computer system to be digitized and packetized for transmission over an IP network and this task is normally performed by a typical KVM/IP switch such as the Cyclades KVMnet product line. The universal connectivity module 44 is responsible for session setup and teardown, authentication and encryption settings, and network forwarding in order to load the KVM viewer application in the client workstation and transport the packetized KVM data to the client. In one example, the video interface is typically VGA and the keyboard and mouse interfaces may be PS/2 or USB which are both well known and understood standards.

Intelligent Power Distribution Unit (IPDU)

An Intelligent power distribution unit is a device which can power various types of equipment and has the capability to switch each power outlet on or off based on command received through its command interface. Typical examples of an IPDU are the Cyclades PM10 and APC products. The IPDU may have a command interface based on command line instructions or may be a based on a text menu architecture. In some cases, the command interface is based on SNMP commands or some proprietary protocol. In accordance with the invention, the universal connectivity module 44 may convert management application/module instructions such as PowerON and PowerOff into device specific instructions which may be transported over Ethernet or over serial RS232 connections depending on the specific device being controlled. The universal connectivity module may also need to use device specific command sets or protocols to translate the standard API commands to device specific commands and sequences. The universal connectivity module in this case may also deal with authentication and encryption of data.

HP iLO

The HP iLO (Integrated Lights Out) is a management interface for HP servers and blades which utilizes Ethernet as a transport. It provides several user interfaces including text console (accessible via Telnet), KVM console (accessed using a proprietary client), power control of the server (controlled using a proprietary protocol), system health monitoring, virtual media. The universal connectivity module 44 (and the iLO module 66) may perform necessary authentication to grant access to these resources and will convert data streams as required. The text console traffic may be converted from the Telnet format to a plain serial stream before being passed to the application layer. Any power control messages (PowerOn, PowerOff) received from the user application will be converted to corresponding iLO command sequences and transmitted to the iLO interface. The KVM application client software will be transported to the client workstation and after authentication will establish the connection between the user workstation and the server. The HP iLO management interface is documented at http://h18013.www1.hp.com/products/servers/management/ which is incorporated herein by reference.

IPMI (Intelligent Platform Management Interface)

IPMI is an emerging standard developed by Intel which deals with the management of computer equipment. IPMI provides a specification for connection to Text consoles, reading of system hardware status such as fan speed etc, and power control of the equipment. The universal connectivity module may translate requests from the application for Power control, system status and management console access to the IPMI protocol format and will deal with session setup/teardown, authentication, and encryption settings. IPMI is documented at http://www.intel.com/design/servers/ipmi/ which is incorporated herein by reference.

Other Management protocols and Interfaces

In accordance with the invention, other management protocols and interfaces (or any newly developed management interfaces may be handled in a similar way by the universal driver in order to provide a standard interface for the application layer to all supported features of the management interface. In each case the universal connectivity module will handle all call setup/teardown, authentication, encryption, conversion of data formats and protocols. Now, several examples of user interfaces of an exemplary out-of-band network management system in accordance with the invention are described.

Figure 5:
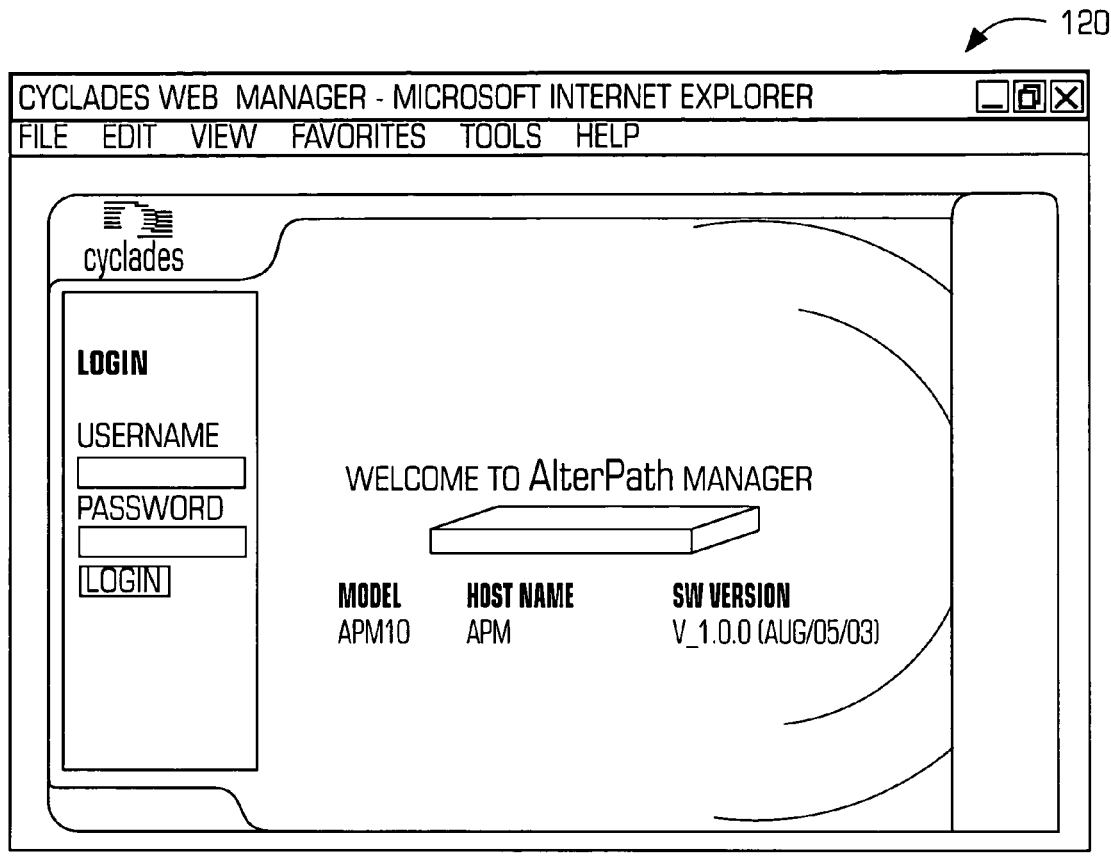
FIG. 5 is a screenshot illustrating the login screen of an exemplary out-of-band network management system in accordance with the invention.

FIG. 5 is a screenshot illustrating the login screen 120 of an exemplary out-of-band network management system in accordance with the invention. As described above, the system provides centralized user authentication for all of the management consoles/interfaces supported by the system. In some management consoles, such as HP iLO, the type of authentication that is natively supported is not sufficient for the enterprise and thus the invention allows for standard enterprise class authentication and security to be enforced for any management interface independent of the protocols and authentication schemes that it natively supports. This is achieved by use of network proxy features that allow connection to consoles only when the user is properly authenticated and authorized to do so.

Figure 6:
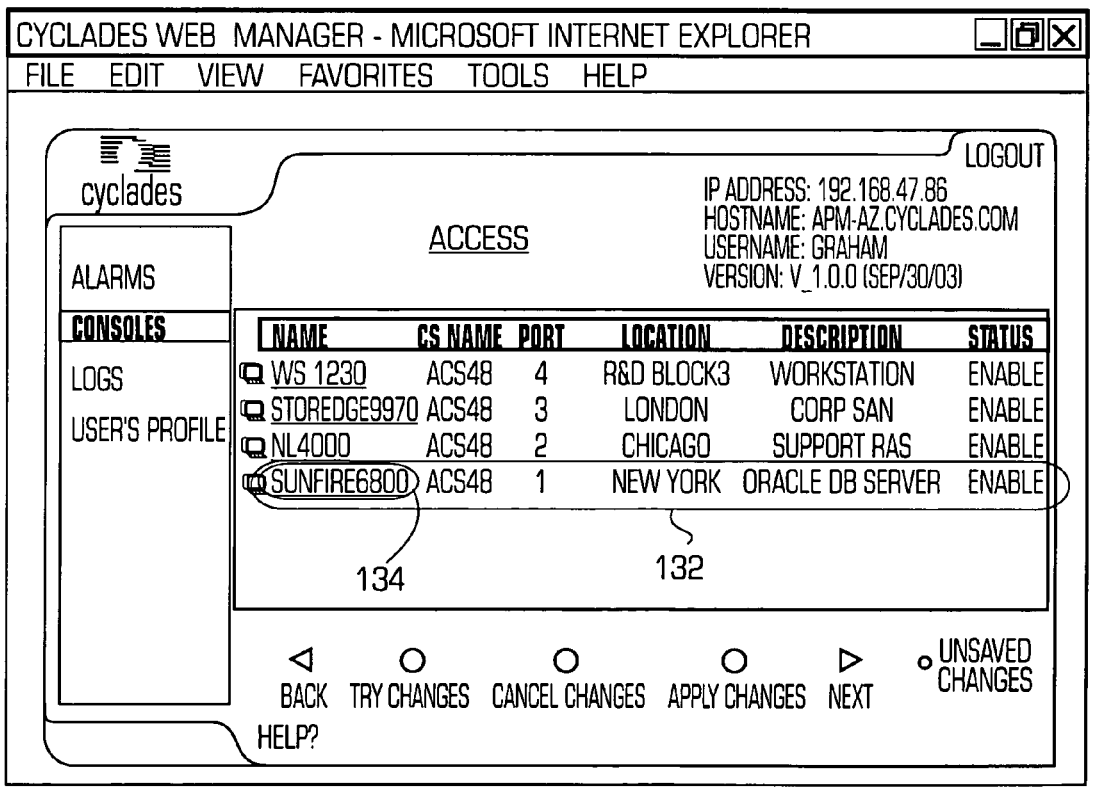
FIG. 6 is a screenshot illustrating an access control screen of an exemplary out-of-band network management system in accordance with the invention.

FIG. 6 is a screenshot illustrating an access control screen 130 of an exemplary out-of-band network management system in accordance with the invention. The access control screen provided consolidated access control since all of the management consoles can be viewed and accessed in a standard and uniform way. The universal connectivity module will perform the necessary addressing and connection setup as well as performing relevant encryption and authentication to the end point device itself. Since each management interface may use a different protocol and require different client applications, the management consoles are consolidated, in accordance with the invention, using the universal connectivity module to perform the required authentication and encryption proxy services so that each device appears to have a common set of features. The screen contains one or more rows 132 of data about each supported console and permits the user to navigate between the management consoles. Within each row is a link 134 (the text of which is the name of the particular management console) that permits the user to launch the applications/clients in order to interact with the particular management console such as shown in FIG. 7.

Figure 7:
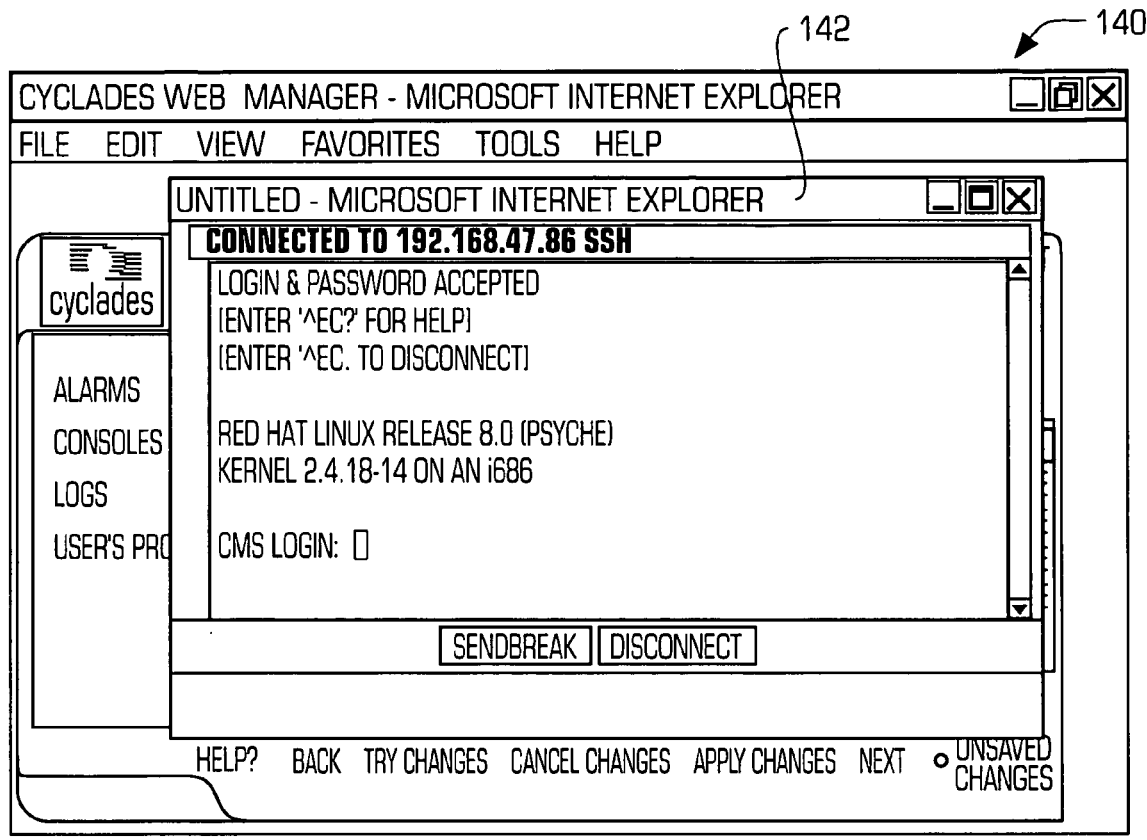
FIG. 7 is a screenshot illustrating a serial console screen of an exemplary out-of-band network management system in accordance with the invention.

FIG. 7 is a screenshot illustrating a serial console screen 140 of an exemplary out-of-band network management system in accordance with the invention. In particular, an example of the launching of an embedded Secure Shell (SSH) client 142 is shown that permits the user to access a serial RS232 Management console. The client 142 is launched by clicking on the Management Console name link 134 in the screen 130 shown in FIG. 6. As shown, the SSH client 142 provides the user with a typical Linux command line interface for the serial management console.

Figure 8:
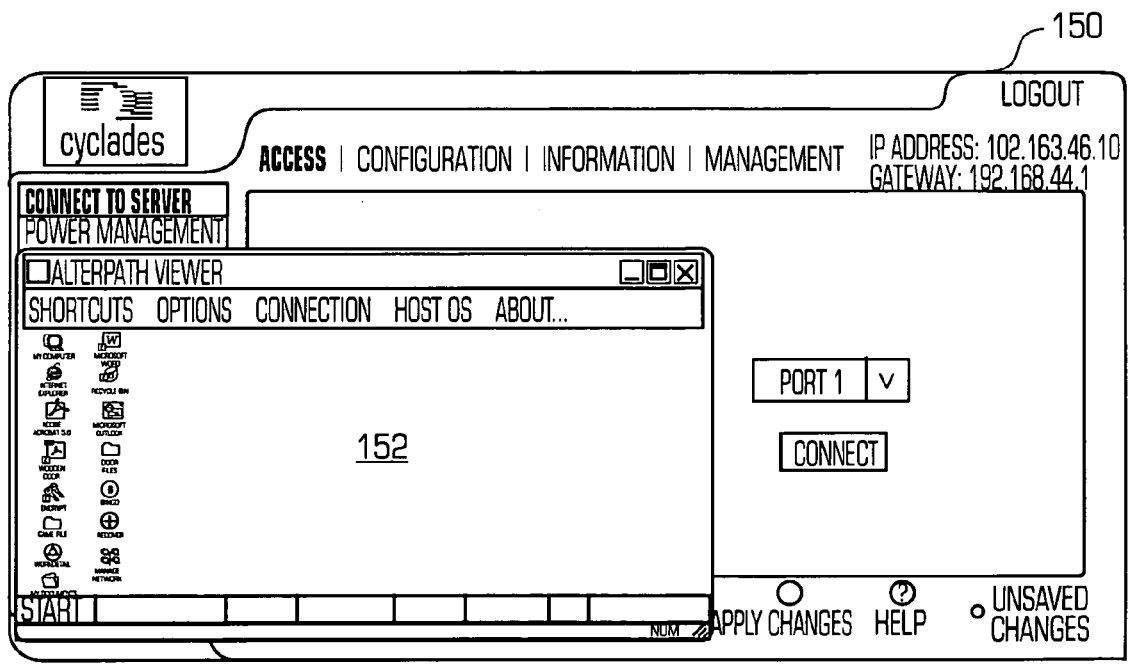
FIG. 8 is a screenshot illustrating a KVM console screen of an exemplary out-of-band network management system in accordance with the invention.

FIG. 8 is a screenshot illustrating a KVM console screen 150 of an exemplary out-of-band network management system in accordance with the invention. In this screen, from the initial login screen, the user may click on the link 134 corresponding to a KVM management console that thus launch a Keyboard Video Mouse (KVM) viewer application 152. The KVM viewer application may also be launched by selecting the KVM application from a listing of management console types. In accordance with the invention, when the viewer application 152 is launched, a connection is dynamically established to the device and authentication and encryption proxy services are performed.

Figure 9:
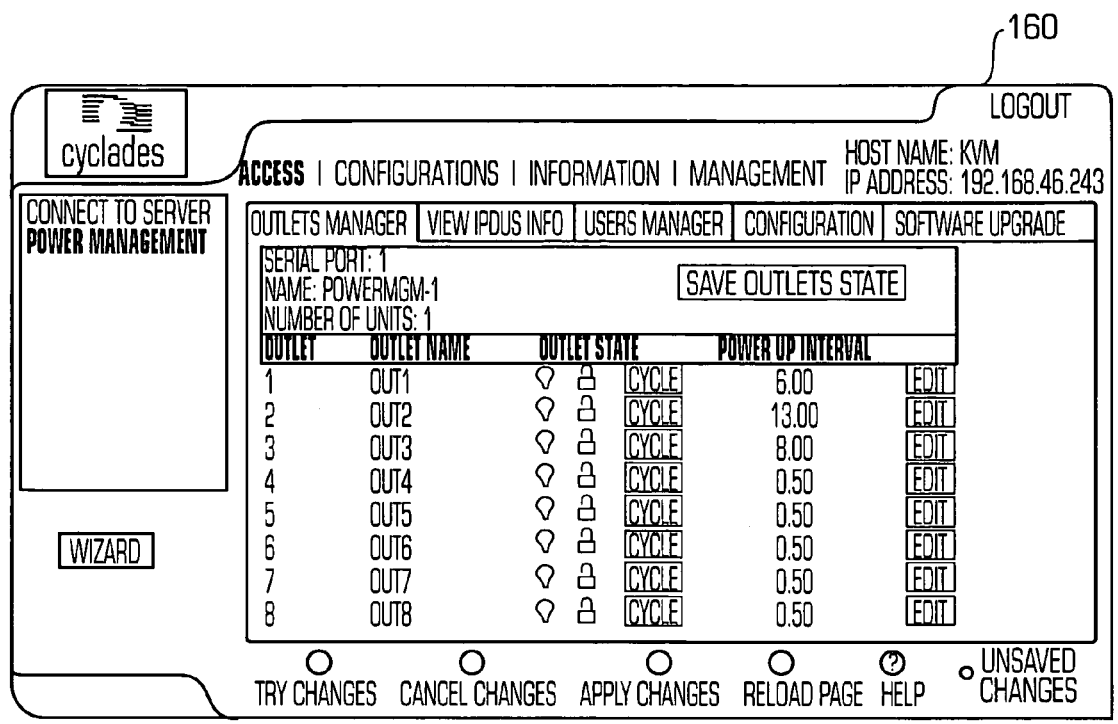
FIG. 9 is a screenshot illustrating a power control console screen of an exemplary out-of-band network management system in accordance with the invention.

FIG. 9 is a screenshot illustrating a power control console screen 160 of an exemplary out-of-band network management system in accordance with the invention. As with the above examples, the user connects to this management console using the standardized uniform interface and has access to a standard set of features for power control such as an outlets manager application/screen (shown in FIG. 9), a view IPDUs information application/screen, a users manager screen/application, a configuration application/screen and a software upgrade application/screen. The universal connectivity manager hides the complexities of connecting to the power devices which in this case could be serial power strips or controlled by SNMP or they could be integrated in a service processor on the target system using IPMI, HP iLO, or SUN ALOM. Each power management protocol requires different session setup and teardown and each may have different levels of security and different command syntax. The invention abstracts this level of complexity allowing any type of power device to be supported by the same application.

Figure 10:
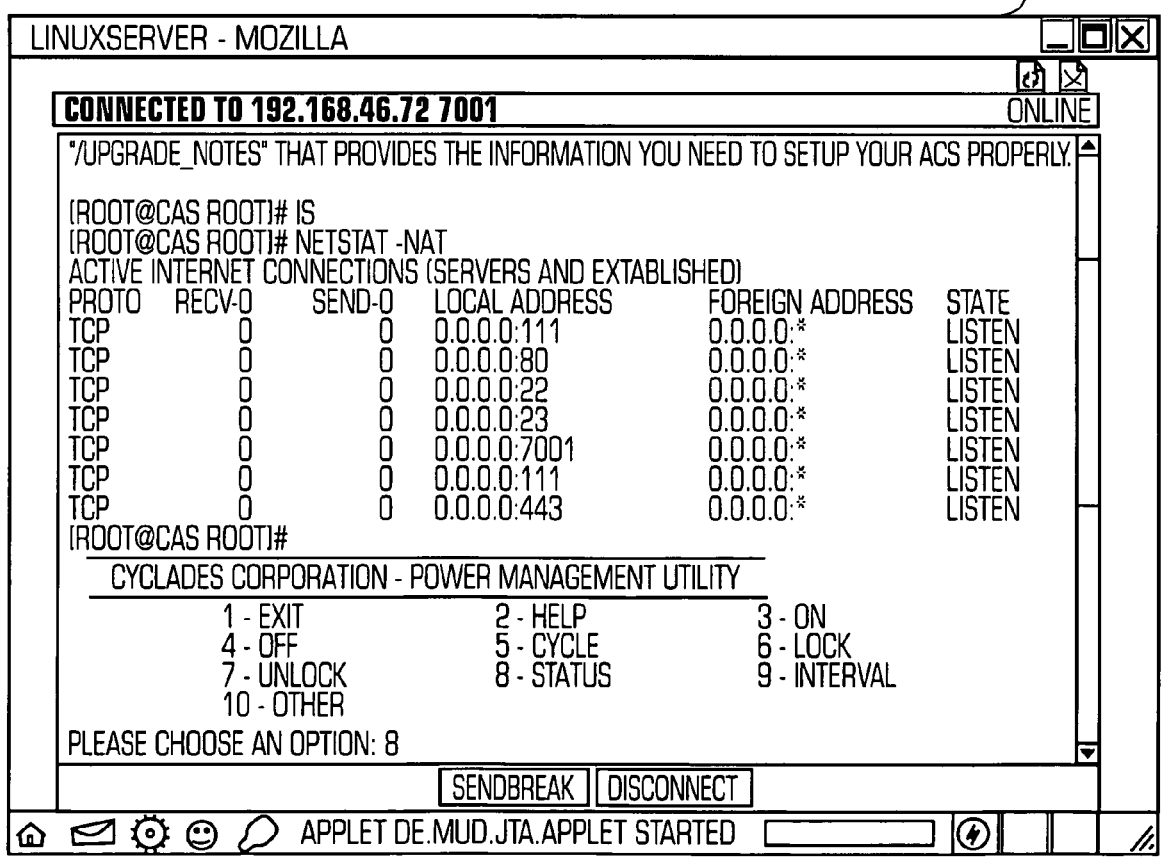
FIG. 10 is a screenshot illustrating a power and console integrated interface screen of an exemplary out-of-band network management system in accordance with the invention.

FIG. 10 is a screenshot illustrating a power and console integrated interface screen 170 of an exemplary out-of-band network management system in accordance with the invention. In this example, the user interface incorporates two completely separate console types. In the example shown in FIG. 10, an IPMI serial over LAN connection provides access to a Linux system console and power control is provided by a Cyclades PM serial Intelligent Power Distribution Unit so that the invention allows each management console type to be used in any context where it is valid. Thus, power control for instance could be provided by an Intelligent Power Distribution unit using SNMP protocol or an ALOM interface using the SUN ALOM protocol.

Figure 11:
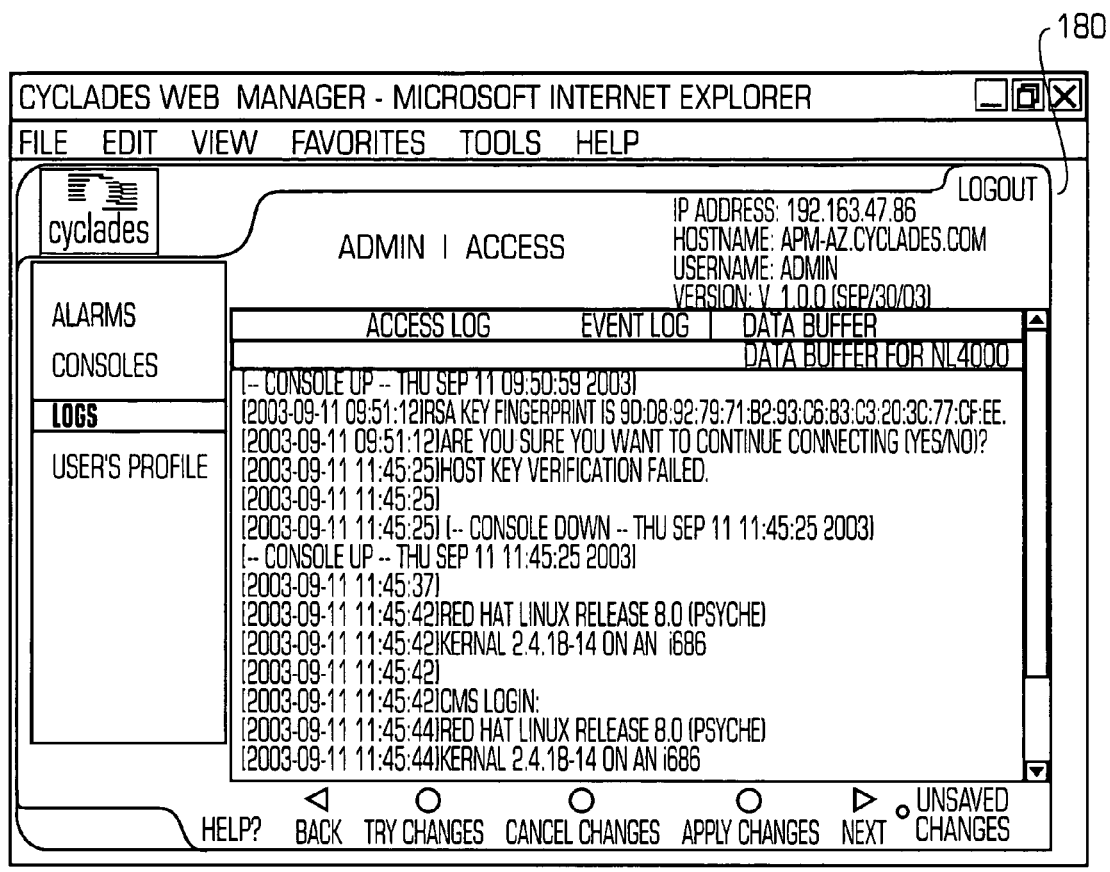
FIG. 11 is a screenshot illustrating a data logging screen of an exemplary out-of-band network management system in accordance with the invention.

FIG. 11 is a screenshot illustrating a data logging screen 180 of an exemplary out-of-band network management system in accordance with the invention. This service is provided by the universal connectivity module for any device or protocol that utilizes ASCII coded characters in its management interface. Thus, the data logging may be used with management interfaces such as RS232 serial or it may be a network connected Secure Shell (SSH) session or it may be using IPMI Serial over LAN protocol (among others). The universal connectivity module provides a serialized data stream to the application independent of the underlying protocols and transport mechanisms used to carry the data from its source.

Figure 12:
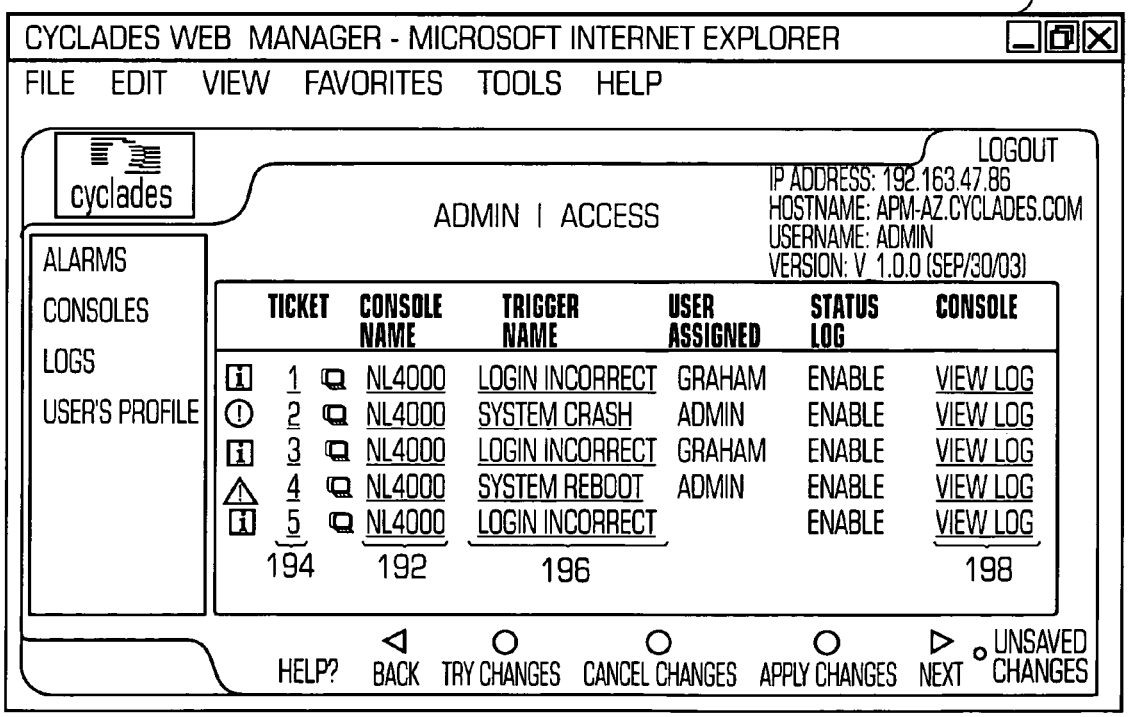
FIG. 12 is a screenshot illustrating an alarm handling screen of an exemplary out-of-band network management system in accordance with the invention.

FIG. 12 is a screenshot illustrating an alarm handling screen 190 of an exemplary out-of-band network management system in accordance with the invention. Thus, the invention provides access to alarm conditions in the underlying management interfaces. These alarms may be transported using SNMP or may be detected by the examination of management console output or may be transported over IPMI etc. The universal connectivity module may allow the detection of each event and translate these to a standard format for use by the application. A common feature in the alarm handling is to provide a proxy service for existing Network Management and Incident Management systems. As shown in FIG. 12, each alarm may permit the user to drill down into the alarm and learn more about its data. Thus, the user can select a console name link 192 to look at the particular console, a ticket link 194 to look at a particular alarm ticket, a trigger name link 196 to look at the particular trigger name details or a console log link 198 to look a the log for the particular console. Now, a method for automated alarm handling will be described in more detail.

Figure 13:
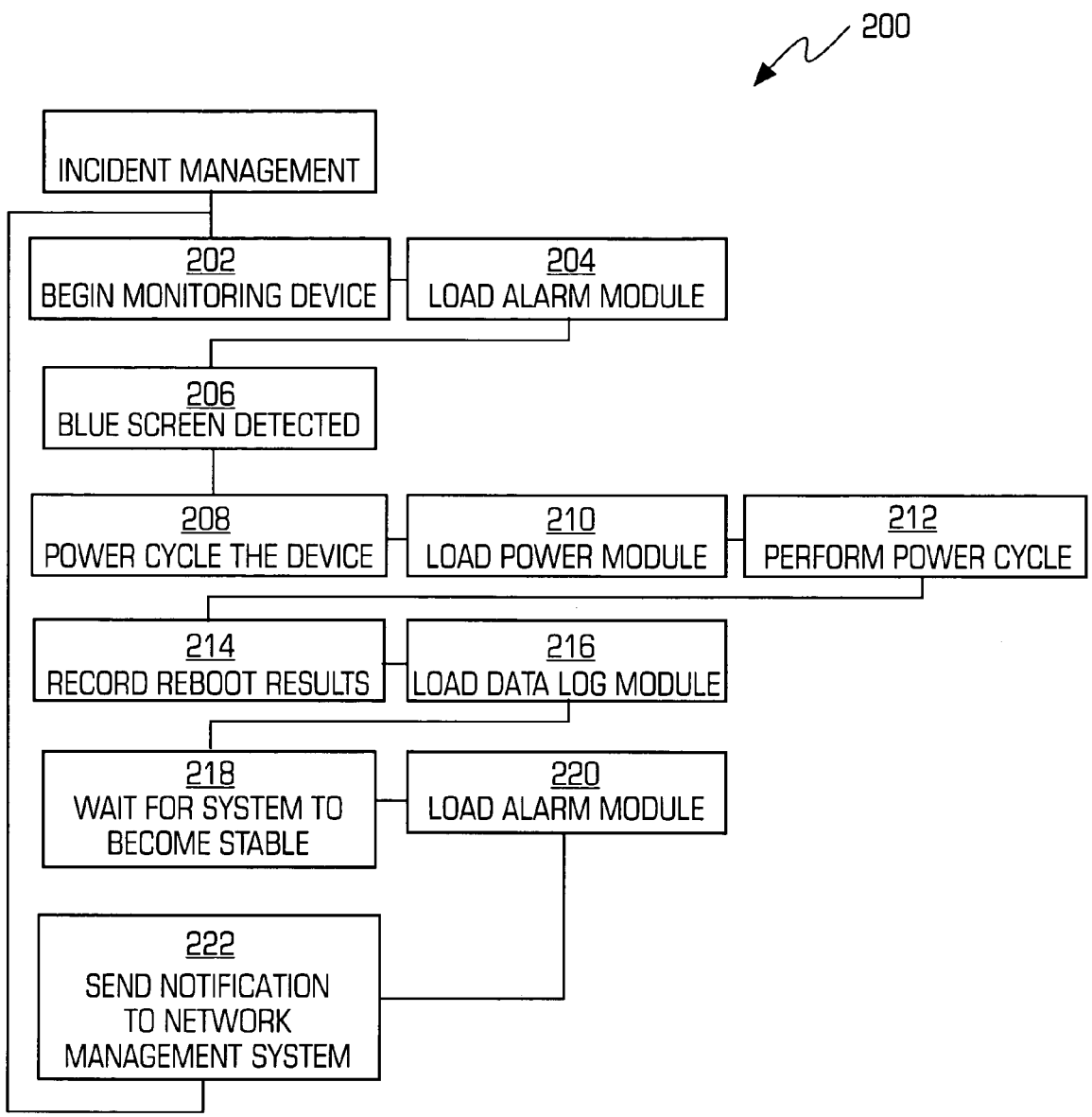
FIG. 13 illustrates an example of automated alarm handling method of an exemplary out-of-band network management system in accordance with the invention.

FIG. 13 is a screenshot illustrating an example of automated alarm handling method 200 of an exemplary out-of-band network management system in accordance with the invention. The invention also allows for localized automated alarm handling. Without the invention, each alarm would be transported to a Network Management system (if a protocol converter were available for that type of device) in order to highlight a problem to an operator. The operator would then use a different application (utilizing a different authentication scheme, connection method, and transport protocol) to access the device to resolve the problem. This approach requires the Network Operation Center or system administrator to have access to multiple client software, and in order to interact with each management interface type the user must install and maintain different protocol stacks utilized by each management interface, use different authentication databases and maintain different passwords or make changes to security policy to accommodate new interface types.

Using the invention, the various access types, authentication types and client management applications are hidden from the public network and are all contained within the invention. For example if a Windows machine crashes and produces a Blue Screen then the invention will detect the problem using XML coded messages received from the Microsoft Windows Emergency Management services module (EMS) in the windows server. This requires that the management console is connected using its access method which is most probably via a serial console server and that the Windows EMS Module is loaded for this port. Once the Alarm condition is recognized, a suitable response would be to power cycle the system. Thus, using the universal connectivity module, a local connection can now be made automatically using an appropriate power controller module. The power control module may be using SNMP over an Ethernet connection or may be using a command line chat script to communicate and control the power control module. Once the universal connectivity module establishes the connection then the power cycle command will be sent automatically by the alarm module to power cycle the system. The data logging service of the universal connectivity module will now be utilized to record the power on messages generated for the affected server and finally the EMS module will detect that the Windows Operating System is now rebooted. An external even can now also be generated to inform the Network Operation Center that the system had crashed, was rebooted and is now operational again.

Thus, as shown in FIG. 13, the universal connectivity module allows communication to multiple device types to achieve alarm monitoring, power cycling and data logging. In each case, a different protocol module and service module may be required. However, since all of the modules are accessible using the universal connectivity module, the alarm event and response can be handled locally by the universal connectivity module. In this example, all of the functions and operation described herein are being performed by one or more modules of the management module 40 of the system. Thus, in step 202, the monitoring of a device is started by the universal connectivity module. In step 204, the alarm management software module is loaded. In step 206, a Blue screen condition for a Windows-based system is detected by the alarm module. In step 208, the system detects that condition and performs an automated response (a power cycle of the device in this example) in step 208. In step 210, the power module is loaded to perform the power cycle of the device in step 212. In step 214, the management module records the reboot results. In step 216, the management module loads the data log module and waits in step 218 for the system to become stable. In step 220, the alarm module is loaded again to determine if the originally detected event/trigger is still occurring. In step 222, the management module may send a notification to the network management system about the automated alarm handling and the results of that automated alarm handling.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. An out-of-band management system for devices on a computer network employing data transmission interfaces for the devices to communicate substantive data on the network, the devices also having management systems to communicate management data associated with the device, the management data being different from the substantive data, the system comprising:
   a plurality of network nodes manageable through a dedicated management interface other than through the data transmission interfaces wherein the plurality of network nodes use at least a plurality of different types of management interfaces that communicate a plurality of different types of the management data over the dedicated management interface and not over the data transmission interfaces;
   a management module, executing on a computer, that receives the plurality of different types of the management data, converts the different types of management data into a common management data format, and communicates the common management data format to a network management system;
   wherein the management module further comprises:
      plural modules with a, corresponding plural computer instructions executed by the computer to communicate with corresponding ones of the devices on corresponding ones of the plurality of network nodes using the plurality of different types of management data, wherein the management module monitors and accesses said devices remotely to restore network connectivity when a network node fails; and
      the network management system further comprising a web server application, executing on a computer, that generates a graphical user interface based on the common management data format and a web-browser that permits a user to access each of the devices through the same management module.

2. The system of claim 1, wherein the management module further comprises a module with a plurality of computer instructions executed by the computer that converts one or more low-level protocols utilized by the management interfaces into one or more higher-level protocols suited for transmission over a TCP/IP network to the network management system.

3. The apparatus of claim 2 wherein the low-level protocols are one or more of an RS-232 protocol, a keyboard video mouse protocol, an intelligent platform management interface protocol, an integrated lights out interface protocol, an advanced lights out management interface protocol and a Blade center management protocol.

4. The apparatus of claim 3, wherein the network nodes are one or more of a serial console server, a keyboard video mouse switch, an intelligent platform management interface device, an integrated lights out interface device, an advanced lights out management interface device and a Blade center management module.

5. The system of claim 1, wherein the management module further comprises a module with a plurality of computer instructions executed by the computer that encrypts the common management data in order to prevent the common management data from being intercepted when in transit to the network management system.

6. The system of claim 1, wherein the management module further comprises a module with a plurality of computer instructions executed by the computer that communicates with enterprise directory systems to authenticate a user before giving them access to the management interfaces.

7. The apparatus of claim 6 wherein the enterprise directory systems employ protocols comprising one of RADIUS, TACACS, SecureID, X509 certificates, Kerberos, NIS, Active Directory and LDAP.

8. The system of claim 1, wherein the management module further comprises a module with a plurality of computer instructions executed by the computer that detects a network management event and executes an action in response to the detection of the network management event.

9. The system of claim 8, wherein the management module further communicates with multiple devices to restore power to a network node.

10. The system of claim 1, wherein the management module further comprises a module that allows communication to multiple devices types to achieve alarm monitoring, power cycling, and data logging.

11. An out-of-band network management method for devices on a computer network employing data transmission interfaces for the devices to communicate substantive data on the network, the devices also having corresponding and different management interfaces to communicate over plural network nodes a plurality of different types of management data associated with the devices, the management data being different from the substantive data, the method comprising:
   receiving at a management module the plurality of different types of management data from the corresponding and different management interfaces;
   converting at the management module the plurality of different types of management data into a common management data format;
   communicating from the management module the common management data format to a network management system;
   generating in a network management system a graphical user interface based on the common management data format on a web server application; and
   permitting access to each of the management interfaces using a web-browser, wherein each of the management interfaces is permitted said access using the same graphical user interface through the same management module, wherein the management module monitors and accesses said devices remotely to restore network connectivity when a network node fails, wherein the plurality of network nodes are managed through a dedicated management interface other than through the data transmission interfaces, and wherein the plurality of network nodes use at least a plurality of different types of management interfaces that communicate the plurality of different types of the management data over the dedicated management interface and not over the data transmission interfaces.

12. The method of claim 11, wherein converting the different management data further comprises converting one or more low-level protocols utilized by the management interfaces into one or more higher-level protocols suitable for transmission over the TCP/IP network.

13. The method of claim 12, wherein the low-level protocols are one or more of an RS-232 protocol, a keyboard video mouse protocol, an intelligent platform management interface protocol, an integrated lights out interface protocol, an advanced lights out management interface protocol and a Blade center management protocol.

14. The method of claim 11 further comprising encrypting the common management data to generate encrypted management data that is communicated to the network management system to prevent the common management data from being intercepted when in transit.

15. The method of claim 11 further comprising authenticating a user before giving them access to the management application and the management interfaces.

16. The method of claim 11 further comprising detecting a pre-programmed event and executing an pre-programmed action upon the detection of the pre-programmed event.

* * * * *